3,332,942
SUBSTITUTED THIADIAZOLES
Philip J. Breivogel, Glen Ridge, N.J., assignor to White Laboratories, Inc., Kenilworth, N.J., a corporation of New Jersey
No Drawing. Filed Nov. 2, 1962, Ser. No. 235,117
6 Claims. (Cl. 260—239.95)

This invention relates to compositions of matter classified in the field of chemistry as 5-alkoxyalkyl-substituted 2-(4-aminophenylsulfonamido)-1,3,4-thiadiazoles and the process for making and using such compositions.

The invention sought to be patented, in its composition aspect, is described as residing in the concept of a chemical compound having a molecular structure in which there is attached to a 1,3,4-thiadiazole nucleus at the 2-position a 4-aminophenylsulfonamido group, or its hereinafter disclosed equivalent, and at the 5-position an alkoxyalkyl group, or its hereinafter disclosed equivalent.

The invention sought to be patented, in its process aspect, is described as residing in the concept of using the tangible embodiment of a composition of matter having a molecular structure in which there is attached to a 1,3,4-thiadiazole nucleus at the 2-position a 4-aminophenylsulfonamido group, or its hereinafter disclosed equivalent, and at the 5-position an alkoxyalkyl group, or its hereinafter disclosed equivalent, by administering such composition as an essential active ingredient of a pharmaceutical formulation for the application of hyperglycemic therapy.

The tangible embodiments of the invention possess the inherent applied use characteristics of exerting an antihyperglycemic effect as evidenced by in vivo evaluation.

As used herein, the term "alkoxyalkyl group" means lower alkoxy-lower alkyl radicals, including the straight and branched chain radicals, among which are, for purpose of illustration but without limiting the generality of the foregoing, the following:

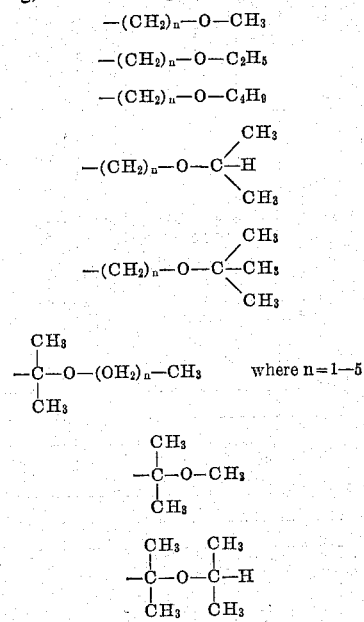

where n=1–5

The manner and process of making and using the invention will now be generally described so as to enable a person skilled in the art of chemistry to make and use the same, as follows:

The 2-amino-5-alkoxyalkyl-1,3,4-thiadiazole starting materials (III) can be prepared according to the following general procedure which involves the condensation and cyclization of thiosemicarbazide (I) with an alkoxyalkyl carboxylic acid, such as methoxyacetic acid (II), in the presence of phosphorous oxychloride. This reaction is illustrated as follows:

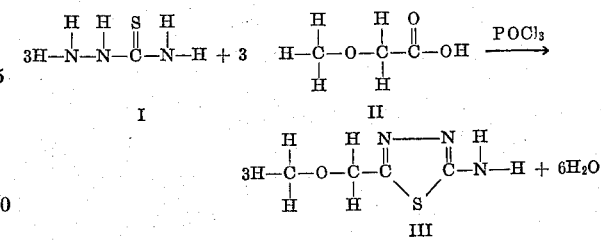

The reaction may be carried out under a reflux condenser and with stirring, by the dropwise addition of approximately one mole of phosphorous oxychloride to a cooled mixture of one mole of alkoxyalkyl carboxylic acid and one mole of thiosemicarbazide at such rate that the reaction temperature remains between 40 and 75° C. The addition usually requires 0.5 to 1.0 hour. When all the phosphorous oxychloride is added, the reaction temperature is raised to about 80–95° C. and stirring is continued for about 3–4 hours. Toward the end of the reaction when the evolution of HCl gas slows down, the reaction mixture may become too thick to stir. In this event stirring is stopped but heating is continued until evolution of HCl gas ceases. The warm reaction mixture is dissolved in water, stirred with decolorizing carbon and filtered. The filtrate is cooled to about 5–10° C. and the 2-amino-5-alkoxyalkyl-1,3,4-thiadiazole is precipitated by the addition of 10 molar sodium hydroxide solution to pH 9–10. The crude product is filtered, washed with water and dried. It may be purified by recrystallization from a suitable solvent such as ethyl acetate, n-butyl acetate, methanol, ethanols, dilute alcohols or water.

The alkoxyalkyl carboxylic acid intermediates employed in the above reaction are generally known or are readily prepared by procedures known to those skilled in the art. Thus, methoxyacetic acid (II), for example, is prepared by adding 2.0 moles of monochloroacetic acid in 200 ml. of anhydrous methanol to a stirred solution of 4.1 gm. atoms of sodium in 850 ml. of anhydrous methanol at such rate that the reaction mixture is maintained at reflux temperature. When all the acid has been added, reflux is continued for approximately ten minutes and the methanol is then removed by distillation. The methanol-free residue is stirred with a solution of approximately 225 ml. of concentrated hydrochloric acid in 300 ml. of water. The free methoxyacetic acid is extracted with ether, the extract is dried over anhydrous sodium sulfate, the solvent is removed by distillation and the crude methoxyacetic acid is purified by distillation under vacuum. Other alkoxyalkyl carboxylic acids may be prepared by the same general procedure by substituting the appropriate acid and/or alcohol in place of the monochloroacetic acid and/or the methanol used above.

Preparation of the 2-(4-aminosulfonamido)-5-alkoxyalkyl-1,3,4-thiadiazoles of this invention is accomplished by the condensation of 4-acetamido-benzenesulfonyl chloride with a 2-amino-5-alkoxyalkyl-1,3,4-thiadiazole, prepared as illustrated above, in the presence of a suitable organic solvent and pyrodine followed by the acid hydrolysis of the acetamido intermediate thus produced.

The reaction is carried out by dissolving the 2-amino-5-alkoxyalkyl-1,3,4-thiadiazole and at least one equivalent of a tertiary base such as pyridine or triethylamine in dioxane, acetone or other suitable solvent, stirring the solution and adding one equivalent of 4-acetamidobenzenesulfonyl chloride in small proportions. During the addition, the temperature is held at approximately 25–40° C. and when the addition is completed, stirring is continued at approximately 70–90° C. for about 1–4 hours to complete the reaction. The reaction mixture is then cooled to about 40° C. and poured into five to ten times its volume of ice water with rapid stirring. The resultant suspension is acidified to pH 1–2 with concentrated hydrochloric acid and stirring is continued until the precipitate becomes granular or crystalline. The crude 2-(4-acetamidophenylsulfonamido) - 5 - alkoxyalkyl-1,3,4-thiadiazole is separated by filtration and, if desired, can be purified by recrystallization from a suitable solvent such as methanol, ethanol, isopropanol or dilutions of these with water prior to hydrolysis.

Hydrolysis of the acetamido intermediate is effected by stirring one part by weight of the acetamido compound with about ten parts by weight of 7% aqueous hydrochloric acid at approximately 90–100° C. for a period of about 0.5 to 2 hours. A solvent such as methanol, ethanol or isopropanol may be employed in the hydrolysis of the less water soluble derivatives. Upon completion of the hydrolysis, the resulting hot solution is stirred with a small amount of decolorizing carbon and filtered. The clear filtrate is cooled to approximately 5–10° C. and sufficient 10 molar sodium hydroxide is added to just redissolve the precipitate which forms. The alkaline solution is then adjusted to about pH 4.0–5.0, by the addition of acetic acid and, after stirring at about 5° C. for approximately 0.5 hour, the precipitated 2-(4-aminophenylsulfonamido)-5-alkoxyalkyl - 1,3,4 - thiadiazole crystals are filtered off, washed with water and dried. The crude product is purified by recrystallization from a suitable solvent such as methanol, ethanol, isopropanol or a dilution of these with water.

According to the above process, for example, 2-amino-5-methoxymethyl-1,3,4-thiadiazole (III) is condensed with 4-acetamidobenzenesulfonyl chloride (IV) to yield 2-(4-acetamidophenylsulfonamido) - 5 - methoxymethyl-1,3,4-thiadiazole (V) which, by acid hydrolysis is converted into the desired 2-(4-aminophenylsulfonamido)-5-methoxymethyl-1,3,4-thiadiazole (VI). These reactions are illustrated as follows:

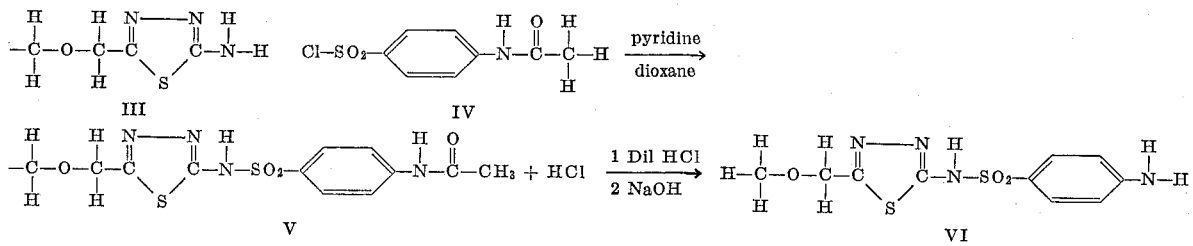

Although the instant invention has been particularly illustrated, and in the subsequent examples will be illustrated, with reference to 5-alkoxyalkyl compounds, the oxygen atom of these substituents may be replaced by sulfur. The corresponding 5 - alkylmercapto - alkyl compounds so produced have the same utility as the illustrated 5-alkoxyalkyl compounds and applicant considers both types of compounds to be fully equivalent.

It will also be apparent to a chemist skilled in the art that the novel compounds of this invention are amphoteric in nature and can be caused to form alkali metal (e.g. sodium, potassium, etc.) and acid addition (e.g. hydrochloride, citrate, etc.) salts by methods well known in the art. These salts also are considered by applicant to be the full equivalents of the novel compounds disclosed above.

The therapeutically active thiadiazoles of this invention can be administered orally in the form of tablets, elixirs, capsules, and the like. In tablet form, they are compounded with an inert pharmaceutical carrier which may contain a suitable binder such as, for example, gums, starches and sugars. They may also be incorporated into a gelatin capsule and also formulated in elixirs which have the advantage of being susceptible to manipulations of flavor by the addition of standard natural or synthetic flavoring materials. Preferably, these compositions are so proportioned as to afford a unit dosage of from 25 to 100 mg.

The following examples show typical tablet, capsule and elixir formulations incorporating the therapeutically active thiadiazoles of this invention. These formulations are illustrative merely and no limitation is intended except as set forth in the appended claims:

TABLET FORMULATION

| Formula: | Milligrams per tablet |
|---|---|
| 2- (4-aminophenylsulfonamido) 5 - n-butoxymethyl-1,3,4-thiadiazole | 25.0 |
| Calcium phosphate dibasic (N.F. dihydrate) | 75.0 |
| Lactose | 31.0 |
| Starch, U.S.P. (10% w./w. paste) | 3.0 |
| Starch, U.S.P. (dry) | 15.0 |
| Magnesium stearate, U.S.P. | 1.0 |

To prepare the tablets, blend the lactose, the dibasic calcium phosphate, ⅔ of the dry starch and the thiadiazole. Slowly add the starch paste and mix until the mass is uniformly wetted (add water, if necessary to produce a wet mass). Pass the wet mass through a 6 mesh screen and dry the resulting granulation at 50° C. overnight. Pass the dry granulation through a 16 mesh screen; add the remainder of the starch and the magnesium stearate, and blend to a uniform mixture. Compress to a target weight of 150 mg. Coat the tablets if desired.

CAPSULE FORMULATION

| Formula: | Milligrams per capsule |
|---|---|
| 2 - (4-aminophenylsulfonamido) 5-n-butoxymethyl-1,3,4-thiadiazole | 25.0 |
| Lactose | 385.0 |
| Magnesium stearate | 10.0 |

Prepare the capsules by passing the dry ingredients through a 30 mesh screen to break up lumps and blend until homogeneous. Fill No. 2 hard gelatin capsule to a target weight of 420 mg.

LIQUID SUSPENSION

| Formula: | Grams per liter |
|---|---|
| Veegum H.V. | 3.0 |
| Water | 150.0 |
| Methylparaben | 1.0 |
| 2 - (4-aminophenylsulfonamido) 5-n-butoxymethyl-1,3,4-thiadiazole | 5.0 |
| Kaolin | 10.0 |
| Flavor | 1.0 |
| Glycerin, q.s., 1.0 liter. | |

Suspend Veegum in water with vigorous agitation. Add the methylparaben and allow the mixture to stand overnight to ensure complete hydration of the Veegum. In a separate vessel, suspend the thiadiazole in approximately 750 cc. of glycerine, add the kaolin and stir until homogeneous. Slowly add the Veegum suspension and the flavor and continue agitation for 1 hour. Adjust the volume to 1 liter with glycerin and stir until homogeneous. Each teaspoon delivers 25 mg. of thiadiazole.

GLYCERIN ELIXIR

Formula:                                              Grams per liter
    Methylparaben ............................................ 1.0
    2 - (4-aminophenylsulfonamido) 5 - methoxymethyl-1,3,4-thiadiazole ........................ 5.0
    Flavor ................................................... 1.0
    Trisodium citrate 2H$_2$O ................................ 30.0
    Glycerin, q.s., 1 liter.

To prepare the elixir, dissolve trisodium citrate in approximately ¾ of the glycerine with stirring and warm, if necessary, to facilitate solution. Add the methylparaben and stir until dissolved. Add the thiadiazole and, if necessary, warm to dissolve. Adjust the volume to 1 liter with glycerine and stir until homogenous. Each teaspoon delivers 25 mg. of the thiadiazole.

The above formulations are usually administered at a rate of from 2–3 tablets or capsules or from 2–3 teaspoons daily, generally with meals. This dosage, however, may be adjusted (i.e. either increased or decreased) depending upon the severity of the underlying hyperglycemia.

The best mode contemplated by the inventor for carrying out his invention will now be set forth as follows:

Example 1

A. *Preparation of 2-amino-5-methoxymethyl-1,3,4-thiadiazole.*—Stir at room temperature a mixture of 0.7 mole of methoxyacetic acid and 0.6 mole of thiosemicarbazide. Start the drop-wise addition of 0.62 mole of phosphorus oxychloride and allow the exothermic reaction to bring the reaction temperature to about 60° C. Apply cooling water to hold the reaction temperature at 60–70° C. during the remainder of the addition. When all is added, continue stirring and bring the reaction temperature to 85–90° C. as rapidly as the foaming and evolution of HCl gas will permit (i.e. about one hour). Continue stirring at 90–95° C. for approximately 1.5 hours longer until evolution of HCl gas practically ceases. If the reaction mixture becomes too thick to stir, continue heating without stirring. Dissolve the warm reaction mixture 500 ml. of water and stir the solution with about 1.0 g. of decolorizing carbon for about 10 minutes and filter. Cool the clear filtrate to about 10° C. and make it basic to pH 9–10 by the gradual addition of 10 molar sodium hydroxide solution. Allow the crystalline suspension of 2-amino-5-methoxymethyl-1,3,4-thiadiazole to stand at 5–10° C. about one hour, filter and wash with about 50 ml. of ice water. Dry the filter cake at about 50° C. Obtain additional crude product by extracting the aqueous mother liquors with ethyl acetate and removing the solvent by evaporation.

To purify, dissolve both crops of crude crystals in about 1,000 ml. of boiling n-butyl acetate. Filter the hot solution and cool the filtrate to 0–5° C. Separate the resulting pure crystals by filtration and wash with about 50 ml. of ice cold n-butyl acetate. Dry in air at about 50° C.

B. *Preparation of 2-(4-aminophenylsulfonamido)-5-methoxymethyl-1,3,4-triadiazole.*—Stir a mixture of 0.1 mole of 2-amino-5-methoxymethyl-1,3,4-thiadiazole, 0.186 mole of dry pyridine and 30 ml. of dioxane at room temperature and add 0.11 mole of 4-acetamidobenzenesulfonyl chloride over a period of about 20 minutes. When all is added, heat the reaction mixture to about 70° C. and continue stirring at this temperature for about 2.5 hours. Cool the reaction mixture to about 40° C. and pour into a mixture of 100 g. of ice and 300 ml. of water with rapid stirring. Acidify the resulting suspension to pH 1.0–2.0 by the addition of concentrated hydrochloric acid. Stir the mixture for about 0.5 hour at 10° C., filter and wash the filter cake with water. Dry at about 60° C. Purify the crude 2 - (4 - acetamidophenylsulfonamido)-5-methoxymethyl-1,3,4-thiadiazole by recrystallization from about four times its own weight of 75% methanol.

Hydrolize 0.645 mole of the acetamido derivative from the preceding step by stirring it with 180 ml. of 7% aqueous hydrochloric acid at 95–100° C. for about 0.5 hour. Stir the hot solution with 1.0 g. of decolorizing carbon for about 10 minutes and filter. Cool the filtrate to about 25° C., add sufficient 10 molar sodium hydroxide solution to just redissolve the precipitate and add acetic acid to pH 4.5. Stir the suspension of fine crystals at 5–10° C. for about one hour, filter and wash the filter cake with water. Dry at about 60° C. Purify the crude 2-(4-aminophenylsulfonamido) - 5 - methoxymethyl-1,3,4-thiadiazole by recrystallization from about fifteen times its weight of 80% isopropanol.

Example 2

A. *Preparation of 2-amino-5-ethoxymethyl-1,3,4-thiadiazole.*—At room temperature, stir a mixture of 0.384 mole of ethoxyacetic acid and 0.362 mole of thiosemicarbazide and start the dropwise addition of 0.385 mole of phosphorous oxychloride. Allow the reaction temperature to rise exothermically to about 60° C. and then apply cooling water to keep the reaction temperature at 60–70° C. during the remainder of the addition. When all is added, continue stirring and slowly heat in a water bath to raise the reaction temperature to 85–90° C. Hold the reaction at this temperature for about 2.5 hours until evolution of HCl gas practically ceases. Dissolve the reaction mass in 1.0 liter of water at about 60° C., stir the solution with about 1.0 g. of decolorizing carbon and filter. Neutralize the clear filtrate to pH 6.5 by the addition of about 40 g. of solid anhydrous sodium carbonate in small portions. Add 110 ml. of acetic anhydride and stir the mixture for about one hour. Filter the resulting crystalline suspension of practically pure 2-acetamido-5-ethoxymethyl-1,3,4-thiadiazole at 15–20° C., wash the filter cake with cold water and dry at about 60° C.

Hydrolyze the acetamido compound by stirring it for about one hour at 95–100° C. with a mixture of 72 ml. of concentrate hydrochloric acid and 72 ml. of water. Dilute the mixture with 50 ml. of water and, while stirring at 50–60° C. make it basic to pH 9.0–9.5 by the addition of about 100 ml. of 10 molar sodium hydroxide solution. Cool the resulting crystalline suspension to about 10° C., filter and wash the filter cake with ice cold water. Dry at about 60° C. Further purify the 2-amino-5-ethoxymethyl-1,3,4-thiadiazole, where desired, by recrystallization from about four times its weight of n-butyl acetate.

B. *Preparation of 2 - (4-aminophenylsulfonamido)-5-ethoxymethyl-1,3,4-thiadiazole.*—Stir at room temperature a mixture of 0.33 mole of 2-amino-5-ethoxymethyl-1,3,4-thiadiazole as prepared above, 0.7 mole of dry pyridine and 67 ml. of dioxane and 0.32 mole of 88% 4-acetamidobenzenesulfonyl chloride over a period of about ten minutes. When all is added, heat the reaction mixture to about 70° C. and continue stirring at this temperature for about 3 hours. Cool the reaction mixture to about 40° C., pour into a mixture of 100 g. of ice and 1 liter of water with rapid stirring and acidify the suspension to pH 1.0–2.0 by the addition of concentrated hydrochloric acid. Stir the mixture for about one hour at 10–15° C., filter and wash the filter cake with water. Dry at about 60° C. Recrystallize the slightly impure 2 - (4 - acetamidophenylsulfonamido)-5-ethoxymethyl-1,3,4-thiadiazole from about nine time its own weight of methanol.

Hydrolyze 0.1 mole of the acetamido derivative from the preceding step by stirring it with 225 ml. of 7% aqueous hydrochloric acid at 95–100° C. for about 2 hours. Stir the hot solution with 1.0 g. of decolorizing carbon for about ten minutes and filter. Cool the clear filtrate to about 25° C., add sufficient 10 molar sodium hydroxide solution to just redissolve the precipitate and then add acetic acid to pH 4.5. Stir the resulting suspension at 5–10° C. for about one hour, filter and wash the filter cake with water. Dry at about 60° C. Recrystallize the crude 2-(4-aminophenylsulfonamido)-5-ethoxymethyl-1,3 4-thiadiazole from about five times its weight of 99% iso-

Example 3

A. *Preparation of 2-amino-5-(2-methoxyethyl)-1,3,4-thiadiazole.*—At room temperature, stir a mixture of 0.625 mole of 3-methoxypropionic acid and 0.60 mole of thiosemicarbazide and start the dropwise addition of 0.653 mole of phosphorous oxychloride. Allow the reaction temperature to rise exothermically to about 50° C. and then apply cooling water to hold the temperature at 45–50° C. during the remainder of the addition. When all is added, continue stirring and heat in a water bath to gradually raise the reaction temperature to about 75° C. over a period of about 3 hours and then hold the reaction at this temperature for an additional hour until evolution of HCl gas ceases. Cool the reaction mixture to about 45° C. and dissolve in 500 ml. of water. Stir the solution with about 1 gm. of decolorizing carbon for about ten minutes and filter. Make the clear filtrate basic to pH 9.0–9.5 by the gradual addition of 10 molar sodium hydroxide solution, cool to 10–15° C. and filter. Wash the filter cake with ice cold water and dry at about 50° C. Recrystallize the slightly impure 2-amino-5-(2-methoxyethyl)-1,3,4-thiadiazole from about ten times its weight of n-butyl acetate.

B. *Preparation of 2-(4-aminophenylsulfonamido)-5-(2-methoxyethyl)-1,3,4-thiadiazole.*—Stir a mixture of 0.188 mole of 2-amino-5-(2-methoxyethyl)-1,3,4-thiadiazole prepared above, 0.633 mole of dry pyridine and 75 ml. of dioxane at room temperature and 0.251 mole of 91.6% 4-acetamidobenzenesulfonyl chloride over a period of about five minutes. When all is added, heat the reaction mixture to about 70° C. and continue stirring at this temperature for about 4 hours. Raise the temperature to about 80° C. and remove most of the dioxane and excess pyridine by distillation under vacuum. Pour the concentrated reaction mixture into 800 ml. of water, 200 gm. of ice and 50 ml. of concentrated hydrochloric acid. Stir the mixture for about one hour at about 10° C., filter and wash the filter cake with water. Dry at about 60° C. Purify the crude 2-(4-acetamidophenylsulfonamido)-5-(2-methoxyethyl)-1,3,4-thiadiazole from about three times it weight of methanol.

Hydrolize 0.15 mole of the acetamido derivative from the preceding step by stirring it with 340 ml. of 7% aqueous hydrochloric acid at 95–100° C. for about 2 hours. Stir the hot solution with 1 gm. of decolorizing carbon for about ten minutes and filter. Cool the clear filtrate to about 25° C., add sufficient 10 molar sodium hydroxide solution to just redissolve the precipitate and then add acetic acid to ph 4.5. Stir the resulting suspension at 5–10° C. for about one hour, filter and wash the filter cake with water. Dry at about 60° C. and recrystallize the slightly impure 2-(4-aminophenylsulfonamido)-5-(2-methoxyethyl)-1,3,4-thiadiazole from about eight times its weight of 50% methanol.

Example 4

A. *Preparation of 2-amino-5-n-butoxymethyl-1,3,4-thiadiazole.*—Stir at room temperature a mixture of 0.613 mole of n-butoxyacetic acid and 0.6 mole of thiosemicarbazide and start the dropwise addition of 0.627 mole of phosphorous oxychloride. Allow the exothermic reaction to bring the reaction temperature to about 60° C. then apply cooling water to hold the reaction temperature at 50–60° C. during the remainder of the addition. When all has been added, continue stirring and heat in a water bath to raise the reaction temperature to 85–90° C. as rapidly as foaming and evolution of HCl gas will permit. Continue stirring at 85–90° C. for about one hour longer until evolution of HCl gas ceases. Dissolve the reaction mixture in 2 liter of water and 60° C. and add about 10 ml. of concentrated hydrochloric acid. Stir the solution with 1 gm. of decolorizing carbon and filter at 60° C. Cool the clear filtrate to about 30° C. and make it basic to pH 9.0–10.0 by the gradual addition of 10 molar sodium hydroxide solution. Separate the precipitate by filtration, wash the filter cake with cold water and dry at about 60° C. Purify the crude 2-amino-5-n-butoxymethyl-1,3,4-thiadiazole by recrystallization from about four times its weight of isopropanol.

B. *Preparation of 2-(4-aminophenylsulfonamido)-5-n-butoxymethyl-1,3,4-thiadiazole.*—Mix 1.0 mole of 2-amino-5-n-butoxymethyl-1,3,4-thiadiazole as prepared above, 3.3 mole of dry pyridine and 400 ml. of dioxane. Stir the mixture at room temperature and add 1.3 moles of 90.6% 4-acetamidobenzenesulfonyl chloride over a period of about twenty minutes. When all is added, raise the reaction temperature to 70° C. over a period of about 2 hours and continue stirring at this temperature for an additional hour. Raise the reaction temperature to 80–90° C. and distill off about 50 ml. of the dioxane and excess pyridine under vacuum. Cool the reaction mixture to about 50° C. and pour with rapid stirring into a mixture of 2 liters of water, 200 gm. of ice and 75 ml. of concentrated hydrochloric acid. Stir the suspension for about one hour at 15–20° C., filter and wash the filter cake with about 4 liters of water. Dry at about 60° C. and recrystallize the crude 2-(4-acetamidophenylsulfonamido)-5-n-butoxymethyl-1,3,4-thiadiazole from about 900 ml. of isopropanol. Concentrate the mother liquor to about 125 ml. and isolate a second crop of crystals. Purify by recrystallization from isopropanol.

Hydrolyze the acetamido derivative from the preceding step by stirring it with a mixture of 1,100 ml. of water, 375 ml. of ethanol and 150 ml. of concentrated hydrochloric acid for about 2.5 hours at reflux temperature. Cool the reaction mixture to 25° C. and add just sufficient 10 molar sodium hydroxide solution to redissolve the precipitate. Filter the solution, heat the filtrate to 45° C. and acidify to pH 5.0 by the gradual addition of about 55 ml. of glacial acetic acid. Stir the resulting suspension at 25° C. for about 0.5 hour, filter and wash the filter cake with about 1,500 ml. of water. Dry at about 60° C. Recrystallize the crude 2-(4-aminophenylsulfonamido)-5-n-butoxymethyl-1,3,4-thiadiazole from about 20 times its weight of 50% methanol.

Example 5

A. *Preparation of 2-amino-5-(4-methoxyphenyl)-1,3,4-thiadiazole.*—At room temperature, stir a mixture of 0.2 mole of anisic acid, 0.2 mole of thiosemicarbazide and 75 ml. of nitrobenzene and add 0.2 mole of phosphorous oxychloride over a period of about ten minutes. When all is added, continue stirring and raise the temperature of the reaction mixture to about 80° C. over a period of one hour. Hold the reaction mixture at this temperature for about 4 hours until evolution of HCl gas ceases. Cool the reaction mixture to about 50° C., stir with a mixture of 3 liters of water and 100 ml. of concentrated hydrochloric acid and remove the nitrobenzene by steam distillation. Stir the resulting solution with about 5 gm. of decolorizing carbon for ten minutes and filter while hot. Make the clear filtrate basic to pH 8.0 by the gradual addition of 10 molar sodium hydroxide solution, cool to 20° C. and filter, wash the filter cake with water and dry at about 60° C.

B. *Preparation of 2-(4-aminophenylsulfonamido)-5-(4-methoxyphenyl)-1,3,4-thiadiazole.*—Stir a mixture of 0.145 mole of 2-amino-5-(4-methoxyphenyl)-1,3,4-thiadiazole as prepared above, 0.5 mole of dry pyridine and 70 ml. of dioxane at room temperature and add 0.2 mole of 91% 4-acetamidobenzenesulfonyl chloride over a period of five minutes. When all is added, continue stirring and raise the temperature of the reaction mixture to 80° C. over a period of twenty minutes and then continue stirring at 75–80° C. for an additional 2 hours. Remove the dioxane and excess pyridine by distillation under vacuum. Stir the concentrated reaction mixture with 300 ml. of water, 20 ml. of concentrated hydrochloric acid and 100 gm. of ice. Continue stirring at 15–20° C. until a uniform dispersion is obtained, filter, wash the filter cake with water and dry at about 60° C.

Hydrolyze 0.1 mole of the practically pure 2-(4-acetamidophenylsulfonamide)-5-(4 - methoxyphenyl)-1,3,4-thiadiazole from the preceding step by stirring it at reflux temperature with a mixture of 200 ml. of ethanol and 50 ml. of concentrated hydrochloric acid for about 4 hours. Dilute the reaction mixture with 600 ml. of water and add 10 molar sodium hydroxide solution to just redissolve the precipitate. Add acetic acid to pH 4.5, filter and wash the filter cake with water. Dry at about 60° C. Purify the crude 2-(4-aminophenylsulfonamido)-5-(4-methoxyphenyl)-1,3,4-thiadiazole by recrystallization from about fourteen times its weight of ethylene glycol monoethyl ether.

Example 6

A. *Preparation of 2-amino-5-isopropoxymethyl-1,3,4-thiadiazole.*—Stir a mixture of 0.45 mole of isopropoxyacetic acid and 0.432 mole of thiosemicarbazide at room temperature and start the dropwise addition of 0.47 mole of phosphorous oxychloride. Allow the reaction temperature to rise exothermically to about 60° C. and then apply cooling water to hold the temperature at 50–60° C. during the remainder of the addition. When all is added, continue stirring and heat in a water bath to raise the reaction temperature to 85–90° C. as rapidly as foaming and evolution of HCl gas will permit. Continue stirring at 85–90° C. for about one hour longer until evolution of HCl gas ceases. Dissolve the reaction mixture in 800 ml. of water at 60–70° C., stir the solution for 15 minutes with 5 gm. of decolorizing carbon and filter. Cool the clear filtrate to about 25° C. and make it basic to pH 9.0–10.0 by the gradual addition of 10 molar sodium hydroxide solution. Filter off the precipitate at about 20° C., wash with water and dry at about 60° C. Recrystallize the crude 2-amino-5-isopropoxymethyl-1,3,4-thiadiazole from about eight times its weight of n-butyl acetate.

B. *Preparation of 2-(4-aminophenylsulfonamido)-5-isopropoxymethyl-1,3,4-thiadiazole.*—Mix 0.25 mole of 2-amino-5-isopropoxymethyl-1,3,4-thiadiazole as prepared above, 0.84 mole of dry pyridine and 100 ml. of dioxane. Stir the mixture at room temperature and add 0.325 mole of 90.6% 4-acetamidobenzenesulfonyl chloride over a period of about ten minutes. When all is added, heat the reaction mixture to 60° C. and continue stirring at this temperature for about 3 hours. Raise the temperature to 80° C. and apply vacuum to remove about 100 ml. of the solvent by distilliation. Pour the residue into a mixture of one liter of water, 500 gm. of ice and 25 ml. of concentrated hydrochloric acid with rapid stirring. Continue stirring at 5–10° C. for about 0.5 hour. Filter the mixture, wash the filter cake with water and dry at 60° C.

Hydrolyze 0.22 mole of the practically pure 2-(-acetamidophenylsulfonamido)-5-isopropoxymethyl-1,3,4 - thiadiazole from the preceding step by stirring it with 500 ml. of 7% hydrochloric acid and 50 ml. of methanol at 90–95° C. for about 2 hours. Stir the hot solution with 2 gm. of decolorizing carbon for about ten minutes and filter. Cool the clear filtrate to about 25° C., add sufficient 10 molar sodium hydroxide solution to just redissolve the precipitate then add acetic acid to pH 4.5. Stir the resulting suspension at 5–10° C. for about one hour, filter and wash the filter cake with water. Dry at about 60° C. Recrystallize the crude 2-(4-aminophenylsulfonamido)-5-isopropoxymethyl-1,3,4-thiadiazole from about twenty times its weight of 50% methanol.

I claim:
1. 2 - (4-aminophenylsulfonamido) - 1,3,4 - thiadiazole having at the 5-position a lower alkoxy-lower alkyl group.
2. The compound 2-(4 - aminophenylsulfonamido) - 5-methoxymethyl-1,3,4-thiadiazole.
3. The compound 2-(4 - aminophenylsulfonamido) - 5-ethoxymethyl-1,3,4-thiadiazole.
4. The compound 2-(4 - aminophenylsulfonamido) - 5-(2-methoxyethyl)-1,3,4-thiadiazole.
5. The compound 2-(4-aminophenylsulfonamido)-5-n-butoxymethyl-1,3,4-thiadiazole.
6. The compound 2-(4 - aminophenylsulfonamido) - 5-isopropoxymethyl-1,3,4-thiadiazole.

References Cited

UNITED STATES PATENTS

| | | | |
|---|---|---|---|
| 2,358,031 | 9/1944 | Roblin et al. | 260—239.95 |
| 2,494,524 | 1/1950 | Sprague | 260—239.75 |
| 2,827,457 | 3/1958 | Slack et al. | 260—239.95 |
| 2,839,529 | 6/1958 | Adams et al. | 260—239.75 |
| 2,848,448 | 8/1958 | Rhodes et al. | 260—239.75 |
| 2,890,984 | 6/1959 | Sahyun | 167—65 |
| 2,921,066 | 1/1960 | Worffel et al. | 260—239.95 |
| 2,986,573 | 5/1961 | Topliss et al. | 167—65 |

FOREIGN PATENTS

| | | |
|---|---|---|
| 231,400 | 12/1960 | Australia. |
| 851,277 | 10/1960 | Great Britain. |
| 858,189 | 1/1961 | Great Britain. |

OTHER REFERENCES

German Auslegeschrift 1,067,440, Oct. 22, 1959.
German Auslegeschrift 1,079,061, Apr. 7, 1960.
Chemical Abstracts, vol. 40, columns 1593 to 1994 (1946) (abstracts of Bovet et al. and Loubatieres).
O'Neal et al.: J. of Med. and Pharm. Chem., vol. 5, pages 617 to 626 (May 1962).

JOHN D. RANDOLPH, *Primary Examiner.*

IRVING MARCUS, WALTER A. MODANCE,
*Examiners.*

E. E. BERG, *Assistant Examiner.*